United States Patent
Tsuchiya et al.

(10) Patent No.: US 7,234,581 B2
(45) Date of Patent: Jun. 26, 2007

(54) CENTRIFUGAL CLUTCH, AND METHOD OF MAKING SAME

(75) Inventors: Ryuji Tsuchiya, Saitama (JP); Shin Nabeya, Saitama (JP); Satoshi Yamaguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 185 days.

(21) Appl. No.: 11/050,468

(22) Filed: Feb. 3, 2005

(65) Prior Publication Data

US 2005/0178637 A1    Aug. 18, 2005

(30) Foreign Application Priority Data

Feb. 17, 2004  (JP) .............................. 2004-039920

(51) Int. Cl.
*F16D 43/14*  (2006.01)

(52) U.S. Cl. .............................. 192/105 CD; 192/30 V (58) Field of Classification Search ...................... None
See application file for complete search history.

(56) References Cited

U.S. PATENT DOCUMENTS 4,830,163 A    5/1989    Miyazaki et al.

6,502,315 B2 *    1/2003    Menzel et al. ................. 30/381

FOREIGN PATENT DOCUMENTS

| FR | 1532772 | * | 7/1968 |
| JP | 08-061383 | | 3/1996 |
| JP | 08-061384 | | 3/1996 |
| JP | 09236140 A | | 9/1997 |
| JP | 2002039227 | * | 9/1997 |
| JP | 2002039227 A | | 2/2002 |

* cited by examiner

*Primary Examiner*—Saul Rodriguez
(74) *Attorney, Agent, or Firm*—Carrier, Blackman & Associates, P.C.; Joseph P. Carrier; William D. Blackman (57) ABSTRACT

A centrifugal clutch includes vibration isolation ring. The vibration isolation ring reduces or prevents the occurrence of squeaking noises due to the vibration of the clutch outer cover. The vibration isolation ring can be made with a large wall thickness, thereby reducing or preventing deformation of an open-end of a drum wall in the clutch outer cover. The vibration isolation ring has a cylindrical shape and is disposed so as to surround the drum wall at a position substantially corresponding to the location at which a portion of a friction material makes a sliding contact with a drum wall. An end portion of the vibration isolation ring is welded to an outer periphery of the drum wall on a side thereof which is distant from a bottom wall of the clutch outer cover.

20 Claims, 4 Drawing Sheets

CENTRIFUGAL CLUTCH, AND METHOD OF MAKING SAME

CROSS-REFERENCE TO RELATED APPLICATIONS

The present invention claims priority under 35 USC 119 based on Japanese patent application No. 2004-039920, filed on Feb. 17, 2004. The subject matter of the referenced priority document is incorporated by reference herein.

BACKGROUND OF THE INVENTION

1. Field of the Invention

The present invention relates to a centrifugal clutch designed to prevent the occurrence of noise such as squeaking due to vibration of a clutch outer cover during a stall state. A stall state occurs when a friction material of a centrifugal weight maintains a state of sliding contact with an inner periphery of a drum wall of the clutch outer cover.

2. Description of the Background Art

A known centrifugal clutch is designed to prevent squeaking of the clutch outer cover. This noise occurs due to vibration of the clutch outer cover. Prevention of the noise is achieved by fastening a vibration isolation ring to a cylindrical drum wall included in the clutch outer cover so that the vibration isolation ring surrounds the drum wall. Such types of clutches are disclosed, for example, in Japanese Laid-open Patent No. Hei 9-236140, Japanese Laid-open Patent No. 2002-39227, and the like.

The centrifugal clutch disclosed in Japanese Laid-open Patent No. Hei 9-236140 includes a vibration isolation ring formed substantially into a bowl shape through press forming. The vibration isolation ring is mounted to an outer periphery of a drum wall by applying pressure thereto. Because of limitations on the wall thickness of the vibration isolation ring, there is a limit to the vibration isolation effect. In the centrifugal clutch disclosed in Japanese Laid-open Patent No. 2002-39227, on the other hand, a simple cylindrically shaped vibration isolation ring is mounted to an outer periphery of a drum wall, allowing the wall thickness of the vibration isolation ring to be increased.

In general, the clutch outer cover tends to become deformed through repeated cold and heat cycles, which it undergoes as a result of the engagement and disengagement of the centrifugal clutch. A vibration damping effect of the vibration isolation ring is impaired when an open-end side of the drum wall is deformed, since the greatest vibration damping effect is achieved at this location. In the centrifugal clutch disclosed in Japanese Laid-open Patent No. 2002-39227, the deformation, resulting from subjection of the drum wall to repeated cold and heat cycles, is not considered.

In view of the foregoing problems, it is an object of the present invention to provide a centrifugal clutch designed to effectively reduce or prevent deformation of an open-end of a drum wall in a clutch outer cover, by using a vibration isolation ring that is increased in wall thickness.

SUMMARY OF THE INVENTION

To achieve the foregoing object, according to a first aspect of the present invention, a centrifugal clutch includes a clutch outer cover, a clutch inner plate, a centrifugal weight, a clutch spring, and a vibration isolation ring. The clutch outer cover is formed into a general bowl shape by a bottom wall that is joined coaxially to an output member. One end of a cylindrical drum wall is integrally joined to an outer periphery of the clutch outer cover. The clutch inner plate is joined to an input member that is coaxial with the output member. The centrifugal weight includes a friction material capable of a frictional engagement with an inner surface of the drum wall. The centrifugal weight is disposed inwardly from the drum wall, and is rotatably supported on the clutch inner plate so as to be brought into a frictional contact with the inner surface of the drum wall in accordance with an operation of a centrifugal force. The clutch spring urges the centrifugal weight in the direction in which the friction material is spaced away from the inner surface of the drum wall. The vibration isolation ring surrounds, and is fastened to, the drum wall. The centrifugal clutch is characterized in the following points. Specifically, the vibration isolation ring of a cylindrical shape is disposed at a position surrounding the drum wall so as to correspond to a portion of the drum wall where a sliding contact of the friction material with the drum wall occurs. Further, an inner periphery of an end portion of the vibration isolation ring is welded to an outer periphery of the drum wall on a side of the drum wall that is opposite to, or spaced apart from, the bottom wall of the clutch outer cover.

In a second aspect of the present invention, in addition to the arrangements according to the first aspect of the present invention, the vibration isolation ring is formed so as to have a wall thickness greater than the thickness of the drum wall. Further, the inner surface of the drum wall is smoothed by machining.

In a third aspect of the present invention, in addition to the arrangements according to the first aspect of the present invention, during operation of the clutch, a friction surface is brought into a frictional contact with the drum wall. This friction surface is initially shaped to be inclined so as to be spaced farther away from the inner surface of the drum wall at an end of the friction surface that is adjacent to the bottom wall of the clutch outer cover.

Further, in a fourth aspect of the present invention, in addition to the arrangements according to the third aspect of the present invention, proximal portions of a plurality of the centrifugal weights are rotatably supported on the clutch inner plate, at a plurality of positions in a circumferential direction of the clutch inner plate, via support pins. Further, the clutch spring is compressively hooked to a proximal portion at one end of one centrifugal weight, and to an intermediate portion at the other end of a second, corresponding centrifugal weight. The one centrifugal weight mutually adjoins the second, corresponding centrifugal weight in the circumferential direction of the clutch inner plate. The clutch spring is then disposed on the side of the bottom wall of the clutch outer cover relative to an inner peripheral portion of the centrifugal weights.

According to the first aspect of the present invention, the vibration isolation ring is cylindrical in shape. This allows the wall thickness of the vibration isolation ring to be easily increased. Further, the inner periphery of the end portion of the vibration isolation ring is welded to the outer periphery of the drum wall on the side of the drum wall that is opposite to the bottom wall of the clutch outer cover. That is, the weld is located adjacent the open-end of the drum wall. This prevents the open-end of the drum wall, known as a key location for achieving the greatest vibration damping effect, from being deformed through repeated cold and heat cycles. The vibration damping effect is therefore enhanced, thus effectively preventing an occurrence of noise due to vibration of the clutch outer cover.

According to the second aspect of the present invention, the vibration isolation ring is formed having a relatively thick wall as compared to the drum wall, which is formed having a relatively thin wall. Thus, the vibration isolation ring prevents the drum wall from being deformed. Moreover, accuracy of the inside diameter of the inner surface of the drum wall has been enhanced through a machining process. Occurrence of squeaking is therefore prevented even more effectively.

According to the third aspect of the present invention, vibration on the open-end side of the drum wall can be effectively suppressed by increasing the contact force between the friction material and the inner surface on the open-end side of the drum wall, since this portion of the drum wall allows the greatest vibration damping effect to be achieved.

According to the fourth aspect of the present invention, the clutch spring exerts a spring force to each of the centrifugal weights as follows. Specifically, the spring force acts in the direction to rotate the centrifugal weight. This rotation occurs such that the friction material formed on one side of the centrifugal weight contacts first the inner surface of the drum wall at a location adjacent to the open-end-side of the drum wall, corresponding to a very small gap between the centrifugal weight and the support pin. This effectively inhibits vibration on the open-end side of the drum wall, while keeping a mild initial inclination angle of the friction surface of the friction material.

Selected examples of modes for carrying out the present invention are explained below by reference to an embodiment of the present invention shown in the attached drawings. The above-mentioned object, other objects, characteristics and advantages of the present invention will become apparent from the following detailed description section presented below in conjunction with the attached drawings.

DETAILED DESCRIPTION OF THE INVENTION

A selected illustrative embodiment of the present invention will be described herein, with reference to the accompanying drawings.

Figure 1:
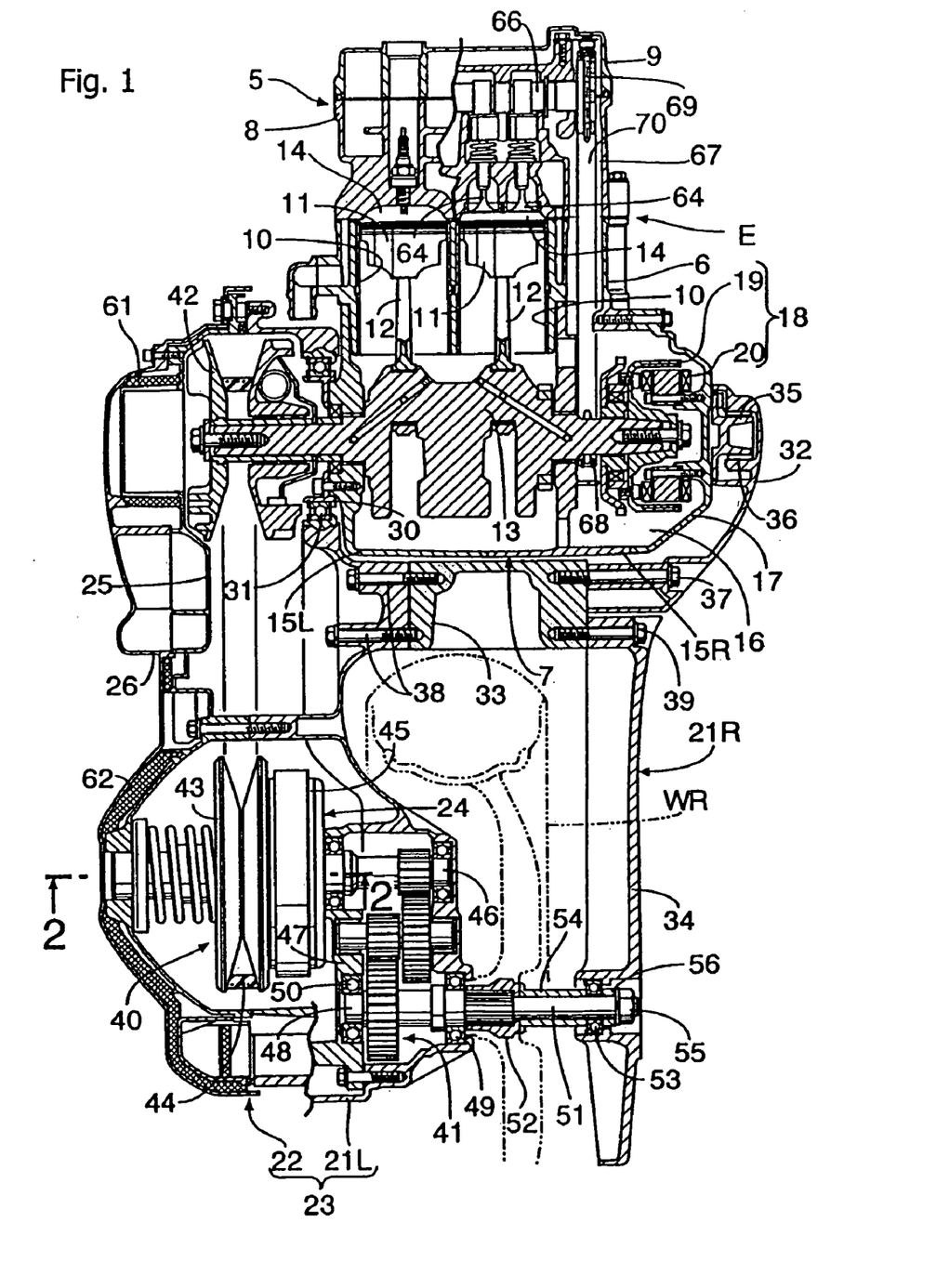
FIG. 1 is a transverse cross-sectional view of an engine for a two-wheel vehicle showing a transmission mounted on the engine.

Referring first to FIG. 1, an engine main body 5 of an engine E that may, for example, be a two-cylinder type, is rigidly fixed on a vehicle body frame of a two-wheeled vehicle. The engine main body 5 includes a cylinder block 6, a crankcase 7, a cylinder head 8, and a head cover 9. The cylinder head 8 is joined to the cylinder block 6, as shown. The head cover 9 is joined to the cylinder head 8 on the side opposite to the cylinder block 6.

The cylinder block 6 includes a pair of cylinder bores 10, 10, extending mutually parallel to each other. The crankcase 7 rotatably supports a crankshaft 13. The crankshaft 13 is connected by way of connecting rods 12, 12 to pistons 11, 11 fitted slidably in a corresponding cylinder bore 10 of the pair of cylinder bores 10, 10, and is joined to the cylinder block 6. Combustion chambers 14, 14 are defined inside of the engine E, facing the pistons 11, 11 in a space between the cylinder head 8 and the cylinder block 6.

The crankcase 7 includes a left and a right crankcase half body 15L, 15R that are joined to each other. A case cover 17 is connected to the right crankcase half body 15R. The case cover 17, together with the right crankcase half body 15R, forms a generator chamber 16. An outer rotor 19 is secured to the crankshaft 13 inside the generator chamber 16. An inner stator 20 is secured to the case cover 17. The inner stator 20, in combination with the outer rotor 19, constitutes an AC generator 18.

A front portion of a first rear arm 21L and a front portion of a second rear arm 21R are supported on the crankcase 7 in the engine main body 5. The first rear arm 21L is disposed on the left side of a rear wheel WR. The second rear arm 21R is disposed on the right side of the rear wheel WR. The front portions of the first rear arm 21L and the second rear arm 21R are supported vertically and rotatably about an axis that is coaxial with an axis of the crankshaft 13. The rear wheel WR is journaled between rear portions of these rear arms 21L and 21R.

The first rear arm 21L constitutes part of a case 23 incorporating a power transmission device 24. Power transmission device 24 transmits power from the engine E to the rear wheel WR. The case 23 is formed of the first rear arm 21L and a cover 22 covering the first rear arm 21L from an outward side. The cover 22 includes a cover inner wall 25 and a cover outer wall 26. The cover inner wall 25 is fastened to the first rear arm 21L. The cover outer wall 26 is fastened to the cover inner wall 25 such that there is a clearance provided from an outer surface of the cover inner wall 25.

An annular support member 30 is fastened to an outer surface of the left crankcase half-body 15L in the crankcase 7. The support member 30 is fastened so as to coaxially surround the crankshaft 13. The crankshaft 13 extends rotatably through the left crankcase half body 15L into the case 23. The front portion of the first rear arm 21L is rotatably supported on the support member 30 via a ball bearing 31.

The second rear arm 21R includes a front portion arm member 32, an intermediate arm member 33, and a rear portion arm member 34. The front portion arm member 32 is supported vertically and rotatably in the crankcase 7. The intermediate arm member 33 is detachably connected to the front portion arm member 32. The rear portion arm member 34 is detachably connected to the intermediate arm member 33.

The front portion arm member 32 is formed so as to extend rearward of the crankcase 7 from a side of the case cover 17. A front portion of the front portion arm member 32 is rotatably supported on a pivot shaft 35 via a roller bearing 36. The pivot shaft 35 is fastened to an outer surface of the case cover 17 coaxially with the crankshaft 13.

The intermediate arm member 33 is disposed between the engine main body 5 and the rear wheel WR. The front portion arm member 32 is detachably connected to a right end portion of the intermediate arm member 33 with a plurality of bolts 37. In addition, the first rear arm 21L is detachably connected to a left end portion of the intermediate arm member 33 with a plurality of bolts 38. That is to say, the first rear arm 21L and the second rear arm 21R are mutually connected between the engine main body 5 and the rear wheel WR. While mutually preventing each other from being twisted, the first and the second rear arm 21L, 21R are supported on the engine main body 5 vertically and rotatably about the axis coaxial with the crankshaft 13.

The rear portion arm member 34 of the second rear arm 21R is detachably connected to the right end portion of the intermediate arm member 33 using a plurality of bolts 39. Thus the second rear arm 21R is independent of the front portion arm member 32. To state it another way, the rear portion arm member 34 is detachably connected to the intermediate arm member 33 in an arrangement which permits separation from the front portion arm member 32 while maintaining a condition in which the front portion arm member 32 is connected to the first rear arm 21L by way of the intermediate arm member 33.

The power transmission device 24 includes a transmission 40 and a reduction gear train 41. The transmission 40 transmits power continuously variably from the crankshaft 13. The reduction gear train 41 reduces speed of an output of the transmission 40 and transmits the reduced speed to the rear wheel WR.

The transmission 40 is a known belt-driven continuously variable transmission, and includes a drive pulley 42 and a driven pulley 43. A continuous belt 44 is wound around both the drive pulley 42 and the driven pulley 43. The drive pulley 41 is provided on the crankshaft 13. The driven pulley 43 is connected to an output shaft 46 via a centrifugal clutch 45. As the speed of the crankshaft 13 increases, the effective diameter of the drive pulley 42 increases, while the effective diameter of the driven pulley 43 decreases. A gear ratio is thereby continuously variable from LOW to HIGH.

A support wall 47 is fastened to the first rear arm 21L inside the case 23. The first rear arm 21L and the support wall 47 rotatably support the output shaft 46 of the transmission 40. The reduction gear train 41 is disposed between the output shaft 46 of the transmission 40 and a final output shaft 48, which is a final output end of the power transmission device 24. The reduction gear train 41 is accommodated between the first rear arm 21L and the support wall 47.

The final output shaft 48 is rotatably supported through a ball bearing 49 of the first rear arm 21L. At the same time, the support wall 47 rotatably supports the final output shaft 48 via a ball bearing 50. An axle 51 is integrally provided for the final output shaft 48 so as to be coaxial, and in a connected row arrangement, with the final output shaft 48.

The axle 51 penetrates through a hub 52 of the rear wheel WR. The axle 51 and the hub 52 are in splined connection to each other so as to prevent relative rotation. The axle 51 is also rotatably supported on the rear portion arm member 34 in the second rear arm 21R via a ball bearing 53. A cylindrical spacer 54 surrounding the axle 51 is interposed between an inner race of the ball bearing 53 on the side of the rear portion arm member 34 and an inner race of the ball bearing 49 of the first rear arm 21L.

A nut 55 is screwed together at an outer end portion of the axle 51 outward from the ball bearing 53. A washer 56 is interposed between the nut 55 and the inner race of the ball bearing 53. When the nut 55 is tightened, the hub 52 of the rear wheel WR and the spacer 54 are sandwiched between the inner races of the ball bearings 49 and 53. The rear portion arm member 34 is separated from the intermediate arm member 33 by loosening the bolts 39 as well as the nut 55. This operation allows the rear portion arm member 34 to be removed laterally along the axis of the axle 51. The operation further allows the spacer 54 and the rear wheel WR to be removed laterally along the axis of the axle 51.

A cooling air cleaner 61 is disposed between the cover inner wall 25 and the cover outer wall 26 at a front portion of the case 23. Air for cooling the belt type transmission 40 is introduced from an outside of the transmission case 23 thereinto by way of the cooling air cleaner 61.

In addition, a sound absorbing material 62 is sandwiched between the cover inner wall 25 and the cover outer wall 26 at a rear portion of the case 23. The cover 22 in the rear portion of the case 23 is designed to include a sound insulating structure.

Reference is now made to the cylinder head 8 in the engine main body 5. An intake valves 64 is disposed for each of the combustion chambers 14, 14. The intake valves 64, 64 control air intake to the combustion chambers 14, 14. In addition, an exhaust valves (not shown) is disposed for each of the combustion chambers 14, 14. The exhaust valves control exhaust from the combustion chambers 14, 14.

In addition, an intake camshaft 66 and an exhaust camshaft (not shown), having an axis parallel with the crankshaft 13, are supported by the cylinder head 8. The intake camshaft 66 provides drive for opening and closing the intake valves 64, 64. The exhaust camshaft provides drive for opening and closing the exhaust valves. A chain chamber 67 facing one end of the camshafts 66 is disposed in the crankcase 7, the cylinder block 6, the cylinder head 8, and the head cover 9 so as to communicate with the generator chamber 16. A drive sprocket 68 is integrated with the crankshaft 13 at a portion corresponding to the chain chamber 67. A continuous timing chain 70 is provided so as to run inside the chain chamber 67. The timing chain 70 is wound around a driven sprocket 69 secured to one end of the intake camshaft 66, a driven sprocket (not shown) secured to one end of the exhaust camshaft, and the drive sprocket 68.

Figure 2:
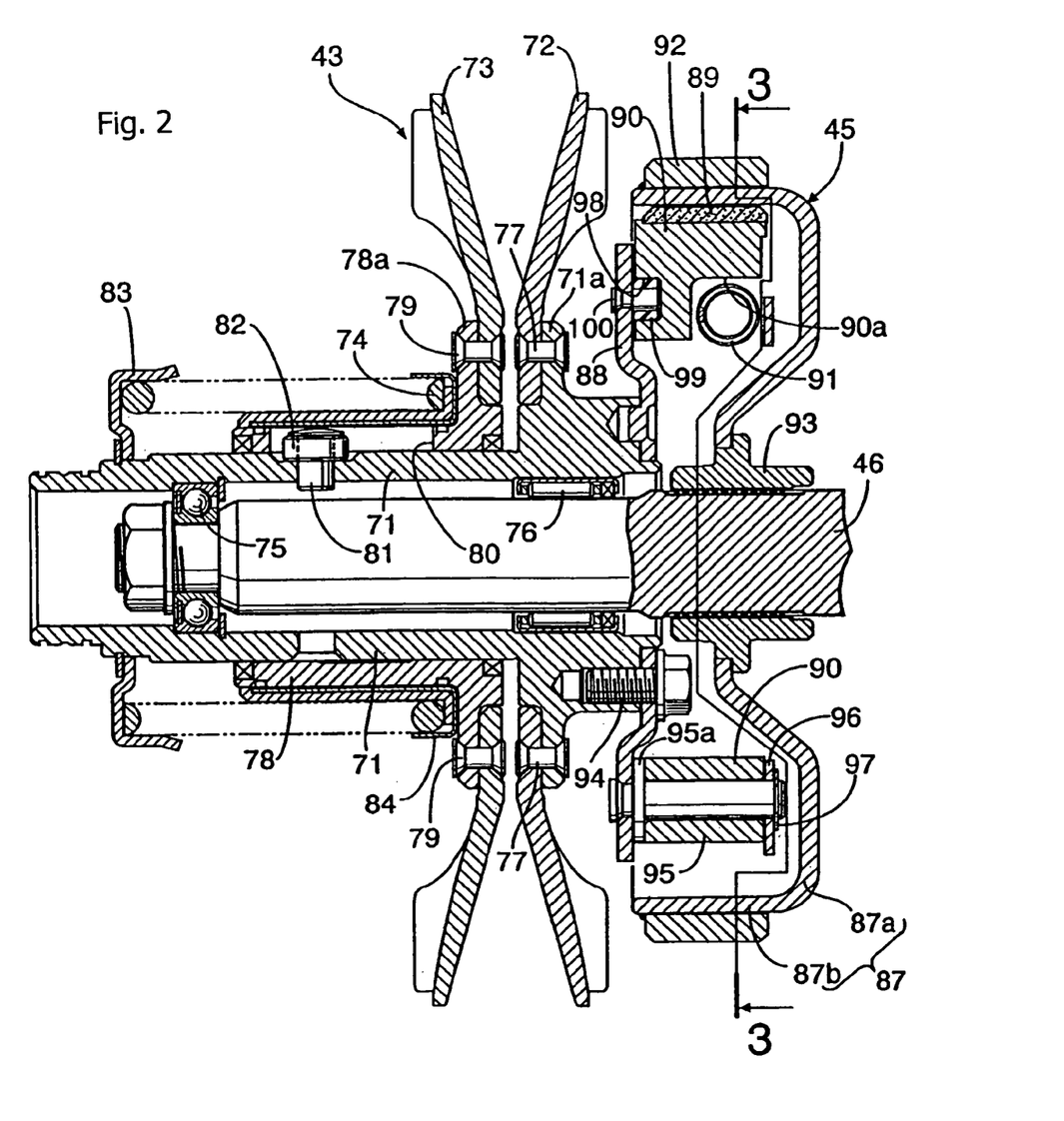
FIG. 2 is an enlarged cross-sectional view of the clutch assembly of an engine taken along line 2—2 of FIG. 1 showing a vibration isolation ring surrounding the cylindrical drum wall at a location overlying the position of the friction material mounted on the surface of the centrifugal weights.

Referring to FIG. 2, the driven pulley 43 constituting part of the transmission 40 includes a fixed side pulley half body 72 and a movable side pulley half body 73. The fixed side pulley half body 72 is secured to a rotary tube 71 capable of rotation relative to the output shaft 46. The movable side pulley half body 73 can move toward and away from the fixed side pulley half body 72. The movable side pulley half body 73 is urged toward the fixed side pulley half body 72 by a spring 74.

The rotary tube 71 is disposed so as to coaxially surround the output shaft 46. The rotary tube 71 is supported via a ball bearing 75 and a roller bearing 76 such that the tube 71 is capable of rotation, and incapable of axial movement, relative to the output shaft 46. The fixed side pulley half body 72 is joined to a flange portion 71a incorporated in the rotary tube 71 by a plurality of rivets 77.

A slide tube 78 is axially slidably mounted on an outer periphery of the rotary tube 71. The movable side pulley half body 73 is joined to a flange portion 78a incorporated in the slide tube 78 by a plurality of rivets 79. A long guide hole 80, extending axially, is provided in the slide tube 78. A roller 82 is pivotally supported through a support shaft 81 on the rotary tube 71. The roller 82 is inserted in the guide hole 80 to permit relative axial movement, while preventing relative rotation, relative to the rotary tube 71.

A spring retaining member 83 is mounted on an outer periphery of the rotary tube 71 on a side opposite to the centrifugal clutch 45. The spring 74 is compressively installed between the spring retaining member 83 and a second spring retaining member 84 mounted on the slide tube 78.

The driven pulley 43, as constructed as described, above operates as follows. Specifically, in accordance with an increasing speed of the crankshaft 13, the drive pulley 42 increases a winding radius of the continuous belt 44, while the driven pulley 43 works to decrease the winding radius of the continuous belt 44.

Figure 3:
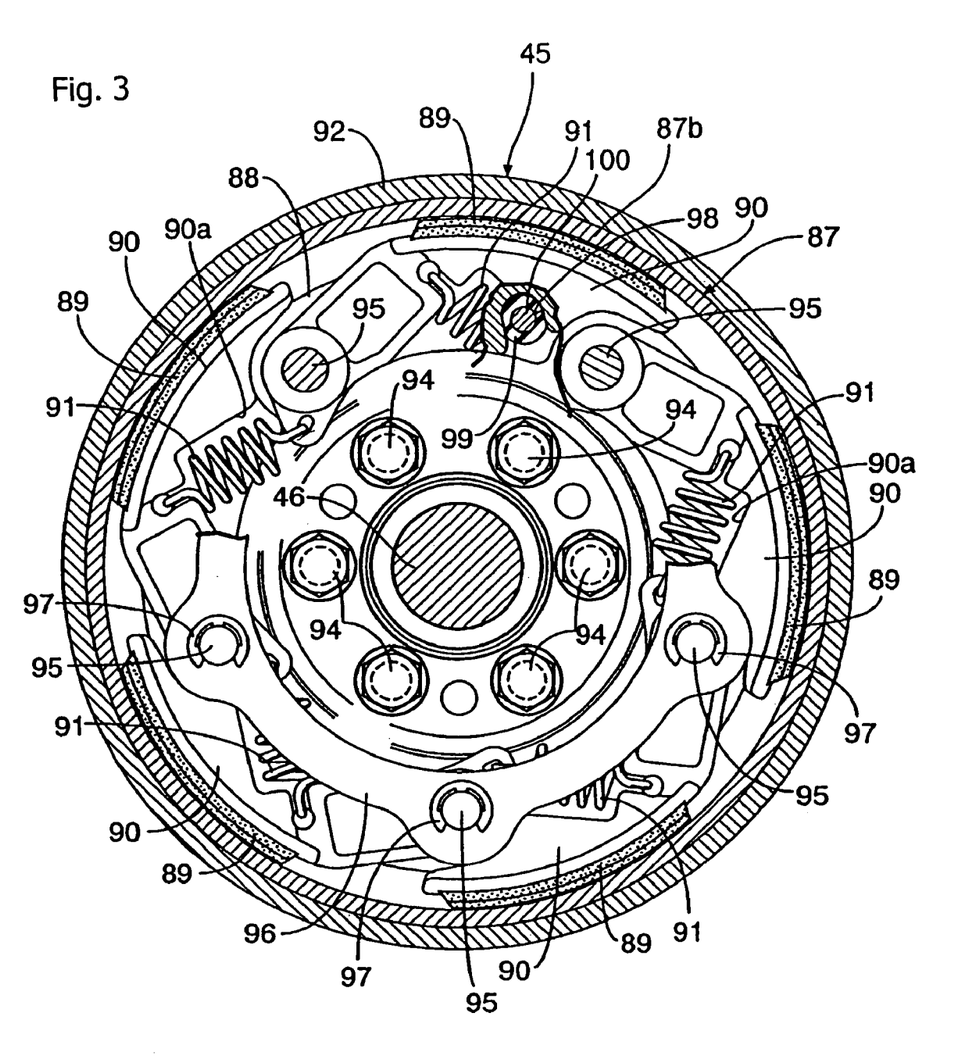
FIG. 3 is a cross-sectional view of the clutch assembly taken along line 3—3 of FIG. 2 showing the arrangement of springs extending between mutually adjacent centrifugal weights.

Referring to FIGS. 2 and 3, the centrifugal clutch 45 includes a clutch outer cover 87, a clutch inner plate 88, a plurality of centrifugal weights 90, clutch springs 91, and a vibration isolation ring 92. In the illustrated embodiment, five centrifugal weights 90 are shown. However, the inventive concept is not limited to this number of centrifugal weights 90.

The clutch outer cover 87 is connected to the output shaft 46 as an output member. The clutch inner plate 88 is connected to the rotary tube 71 as an input member. Each of the plurality of centrifugal weights 90 includes a friction material 89 to be brought into a frictional engagement with the clutch outer cover 87. The centrifugal weight 90 is rotatably supported on the clutch inner plate 88. Each of the clutch springs 91 urges each of the centrifugal weights 90 in a direction to disengage the frictional engagement between the clutch outer cover 87 and the friction materials 89. The vibration isolation ring 92 is fastened to the outer wall of the clutch outer cover 87.

The clutch outer cover 87 is formed in a substantially cylindrical bowl shape. Specifically, the bowl shape is formed by integrally joining one end of a cylindrical drum wall 87b to an outer periphery of an annular bottom wall 87a. A cylindrical sleeve 93 is welded to an inner periphery of the bottom wall 87a, and is also secured to the output shaft 46 through a spline connection. That is to say, the bottom wall 87a of the clutch outer cover 87 is connected to the output shaft 46 using a spline connection, for concurrent rotation therewith. The clutch inner plate 88 is formed as an annular plate, and is oriented so as to substantially oppose the bottom wall 87a of the clutch outer cover 87. The clutch inner plate 88 is joined to an end portion of the rotary tube 71 with a plurality of bolts 94.

Proximal portions of a plurality of the support pins 95 are secured to the clutch inner plate 88 at a plurality of equally spaced places. For example, the illustrated embodiment shows five support pins 95 positioned equidistantly in a circumferential direction of the clutch inner plate 88. Each of these support pins 95 has an axis running in parallel with the output shaft 46 and the rotary tube 71. Further, each of the support pins 95 includes a flange portion 95a adjacent to the clutch inner plate 88. Flange portion 95a makes a sliding contact with a surface of each of the centrifugal weights 90. Annular pinching plates 96 are provided on centrifugal weights 90 on the side opposite to the clutch inner plate 88. The centrifugal weights 90 and annular pinching plates 96 are accommodated in the clutch outer cover 87.

Retaining rings 97, which engage with the pinching plates 96, are press fit to proximal portions of the centrifugal weights 90 and leading end portions of the support pins 95 that are passed through the pinching plates 96. That is to say, each of the proximal portions of the centrifugal weights 90, sandwiched between each of the flange portions 95a of the support pins 95 and each of the pinching plates 96, is rotatably supported through the corresponding one of the support pins 95 at five places along the circumferential direction of the clutch inner plate 88. Each of the centrifugal weights 90 is thereby rotated in the direction which tends to bring the friction material 89 into the frictional engagement with the inner surface of the drum wall 87b through the following operation. The operation is, specifically, a centrifugal force that is made greater as the speed of the clutch inner plate 88 or the rotary tube 71 increases.

The centrifugal weights 90 are formed of a single zinc alloy into a shoe shape. One of the friction materials 89, which provides a frictional engagement with the inner surface of the drum wall 87b, is bonded to the outer periphery of each of the respective centrifugal weights 90. Each of the clutch springs 91 urges the corresponding centrifugal weight 90 in the direction of moving the respective friction materials 89 away from the inner surface of the drum wall 87b, in the clutch outer cover 87. One end of the clutch spring 91 is compressively hooked to a proximal portion of a centrifugal weight 90 (FIG. 3), and the other end of the clutch spring 91 is hooked to an intermediate portion of a second, adjacent centrifugal weight 90. The adjacent centrifugal weights are mutually adjoining in the circumferential direction of the clutch inner plate 88. In addition, the clutch spring 91 is disposed on an inner peripheral portion of each centrifugal weight 90 on the side facing the bottom wall 87a of the clutch outer cover 87. Each centrifugal weight 90 has a recessed portion 90a formed therein at a portion of the inner peripheral portion thereof facing the bottom wall 87a, for accommodating part of each clutch spring 91.

As seen best in FIG. 2, each of the centrifugal weights 90 also has a fitting recessed portion 98 provided in the surface of the inner peripheral side of an intermediate portion thereof, facing the clutch inner plate 88. Each of the fitting recessed portions 98 extends arcuately along a virtual circle having the axis of the support pin 95 as its center. Rubber or elastomeric dampers 99, which are snap fit into these fitting recessed portions 98, are supported on the clutch inner plate 88 with pins 100.

Figure 4:
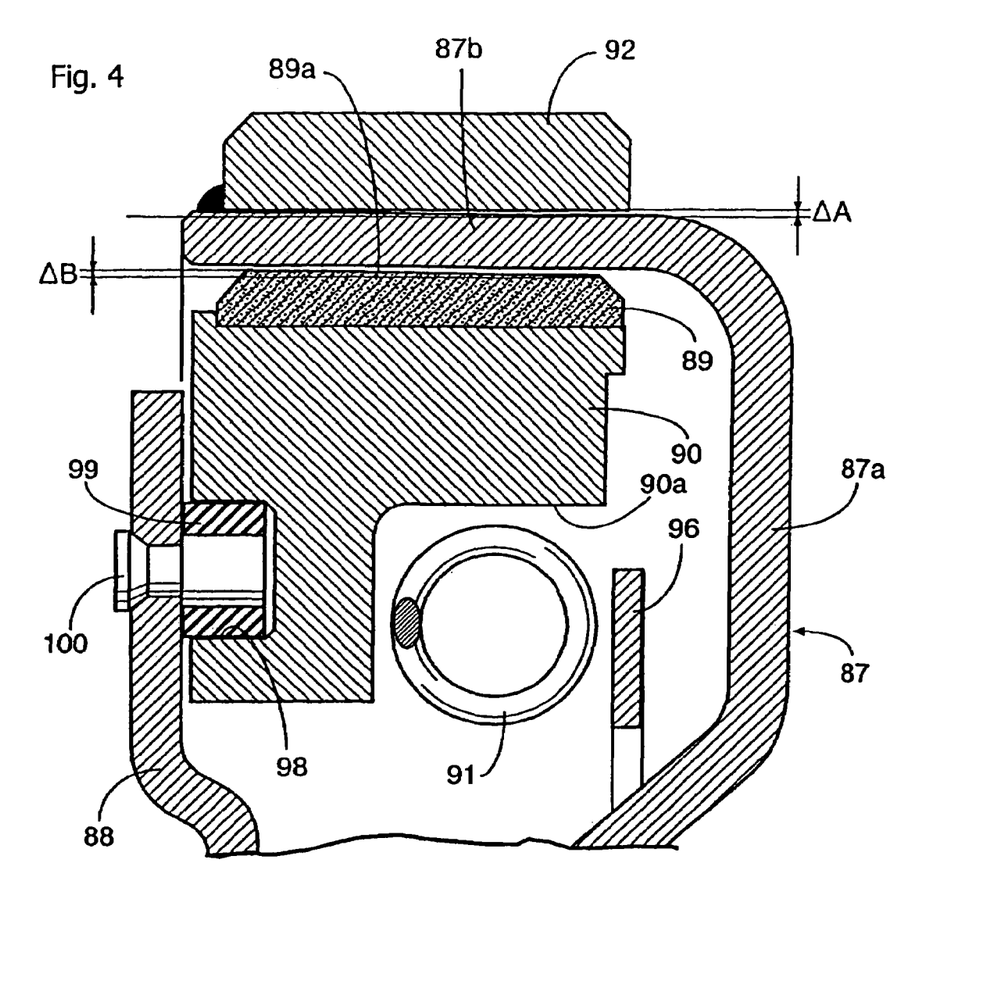
FIG. 4 is an enlarged, detail view of the cylindrical drum wall showing the incline of the frictional surface relative to the inner side of the cylindrical drum wall, and showing the position of the weld which joins periphery of the vibration isolation ring to the periphery of the cylindrical drum wall adjacent to its open-end.

Referring also to FIG. 4, the vibration isolation ring 92 is formed into a simple cylinder having substantially the same diameter throughout the entire circumference thereof, although the corner edges may be chamfered, as shown. The vibration isolation ring 92 surrounds the drum wall 87b, and is disposed at a position thereon corresponding to the location at which the friction material 89 makes a sliding contact with the drum wall 87b.

The vibration isolation ring 92 is fastened to the drum wall 87b as follows. Specifically, the inner periphery of the end portion of the vibration isolation ring 92 is welded to the outer periphery of the drum wall 87b. The vibration isolation ring 92 is welded at several places in the circumferential direction, and each weld is positioned on the side of the drum wall 87b of the clutch outer cover 87 that is opposite to the bottom wall 87a of the clutch outer cover 87.

According to the illustrated embodiment of the present invention, the inner periphery of the end portion of the vibration isolation ring 92 is welded to the outer periphery of the drum wall 87b at six places, each being an equal angle of 60 degrees spaced apart from each other in the circumferential direction. As such, the welding points of the vibration isolation ring 92 to the drum wall 87b are out of phase with respect to the five centrifugal weights 90 disposed at equal intervals in the circumferential direction. This arrangement helps to minimize or prevent resonance.

The clutch outer cover 87 is press-formed. The draft angle is therefore assigned such that the outside diameter of the drum wall 87b is greater on the open-end side of the drum wall 87b than on the end adjacent to the bottom wall 87a. The inside diameter of the vibration isolation ring 92, on the other hand, remains constant along the axial direction, since the inner surface of the vibration isolation ring 92 is finished by machining. The inner periphery of the end portion of the vibration isolation ring 92 is welded to the outer periphery of the drum wall 87b, on the side of the drum wall 87b that is opposite to the bottom wall 87a as follows: Specifically, this welding is performed with the drum wall 87b press-fitted into, and temporarily secured in, part of the vibration isolation ring 92 adjacent to the clutch inner plate 88. As a result, a clearance of ΔA is produced when the vibration isolation ring 92 is fastened to the drum wall 87b at a location between the inner periphery of the end portion of the vibration isolation ring 92 and the outer periphery of the drum wall 87b adjacent to the bottom wall 87a.

The inner surface of the drum wall 87b is also smoothed by machining. The vibration isolation ring 92 is formed so as to have a wall thickness larger than the wall thickness of the drum wall 87b. According to the selected illustrative embodiment of the present invention, the vibration isolation ring 92 is formed to have a wall thickness, for example, substantially doubling that of the drum wall 87b.

Each of the friction surfaces 89a of the friction materials 89, bonded to the outer periphery of each of the centrifugal weights 90 is initially shaped to be inclined. The incline is formed such that the spacing between the friction surface 89a and the inner surface of the drum wall 87b increases as the friction surface 89a approaches the bottom wall 87a of the clutch outer cover 87. In the initial state of the friction material 89, therefore, the end portion of the friction surface 89a adjacent to the clutch inner plate 88 is disposed at a position closer to the inner surface of the drum wall 87b than the end portion of the friction surface 89a adjacent to the bottom wall 87a by a distance of ΔB.

The operation of the selected illustrative embodiment of the present invention will now be described. In the centrifugal clutch 45, the vibration isolation ring 92 is fastened to the outer surface of the drum wall 87b of the clutch outer cover 87, so as to encircle and surround the drum wall 87b. The vibration isolation ring 92 is formed into a simple cylinder having substantially the same diameter throughout its entire circumference, as noted above. The vibration isolation ring 92 is disposed so as to surround the drum wall 87b at a position corresponding to the location at which a portion of the friction material 89 makes a sliding contact with the drum wall 87b. The inner periphery of the end portion of the vibration isolation ring 92 is welded to the outer periphery of the drum wall 87b on the side of the drum wall 87b that is opposite to, or distant from, the bottom wall 87a of the clutch outer cover 87.

It is therefore easy to increase the wall thickness of the vibration isolation ring 92. Welding with the vibration isolation ring 92 can also prevent the open-end of the drum wall 87b, which is the end of the drum wall 87 at which the greatest vibration damping effect can be achieved, from being deformed through repeated cold and heat cycles. The vibration damping effect is therefore enhanced, and noise due to vibration of the clutch outer cover 87 is effectively reduced or prevented.

Assume a case, on the other hand, in which the inner periphery of the end portion of the vibration isolation ring 92 is welded to the outer periphery of the drum wall 87b adjacent to the bottom wall 87a of the clutch outer cover 87. In this case, the open-end of the drum wall 87b is deformed by repeated cold and heat cycles. It then becomes difficult for the front surface of the friction material 89 to make a sliding contact with the inner surface of the drum wall 87b. This impairs the vibration damping effect. Moreover, the clearance between the vibration isolation ring 92 and the drum wall 87b becomes larger, decreasing the overall thermal capacity of the clutch outer cover 87. It is then likely that the clutch function will be impaired, due to a resultant increase in temperature on the surface of sliding contact of the friction material 89.

As noted earlier, the inner periphery of the end portion of the vibration isolation ring 92 is welded to the outer periphery of the drum wall 87b on the side of the drum wall 87b that is opposite to the bottom wall 87a of the clutch outer cover 87. The vibration isolation ring 92 is only attached to the drum wall 87b at several selected locations, with the drum wall 87b press-fitted into, and temporarily secured in, part of the vibration isolation ring 92. In this manner, the time required for fastening the vibration isolation ring 92 to the drum wall 87b is shortened, enhancing manufacturing productivity.

In addition, the vibration isolation ring 92 is formed to have a wall thickness greater than that of the drum wall 87b. In the illustrated embodiment, the vibration isolation ring 92 is about twice as thick as the drum wall 87b. The drum wall 87b, having a relatively thinner wall, is substantially prevented from being deformed, because the vibration isolation ring 92 has a thicker wall. Moreover, the inner surface of the drum wall 87b is machined smooth. Accuracy of the inside diameter of the inner surface of the drum wall 87b is therefore enhanced through machining. This results in a more effective prevention of the occurrence of squeaking.

The friction surface 89a of the friction material 89, brought into a frictional contact with the drum wall 87b, is initially shaped to be inclined. The incline provides decreased spacing between the friction surface 89a and the inner surface of the drum wall 87b on the side of the drum wall 87b that is farther away from the bottom wall 87a of the clutch outer cover 87. Vibration on the open-end side of the drum wall 87b can be effectively suppressed by the increased contact force between the friction material 89 and the inner surface of the drum wall 87b resulting from this inclination.

Further, the proximal portion of the centrifugal weight 90 is rotatably supported, through the support pin 95, at several places along the circumferential direction of the clutch inner plate 88. One end of the clutch spring 91 is compressively hooked to the proximal portion of a centrifugal weight 90, and the other end of the clutch spring 91 is hooked to the intermediate portion of the adjacent centrifugal weight 90. The adjacent centrifugal weights 90 are mutually adjoining in the circumferential direction of the clutch inner plate 88. A clutch spring 91 is disposed on the inner peripheral portion of each centrifugal weight 90 adjacent to the bottom wall 87a of the clutch outer cover 87.

In this state, the clutch spring 91 exerts a spring force to each of the centrifugal weights 90 as follows. Specifically, the spring force acts in the direction to tilt the centrifugal weight 90 such that the friction material 89 contacts the inner surface of the drum wall 87b. Even more specifically, the friction material 89 adjacent to the open-end side of the drum wall 87b contacts the inner surface of the drum wall 87b first, or before remaining portions of the friction material, corresponding to a very small gap between the centrifugal weight 90 and the support pin 95. This effectively inhibits vibration on the open-end side of the drum wall 87b, while maintaining a mild initial inclination angle of the friction surface 89a of the friction material 89.

While the present invention is thus described according to the illustrated embodiment thereof, it is obvious that the invention may be varied in many ways. Such variations are not to be regarded as a departure from the spirit and scope of the invention, and all such modifications are intended to be included within the scope of the claims.

For example, according to the embodiment of the present invention described in the foregoing, the vibration isolation ring 92 is fastened to the drum wall 87b as follows. Specifically, the inner periphery of the end portion of the vibration isolation ring 92 is welded to the outer periphery of the drum wall 87b on the side of the drum wall 87b that is opposite to the bottom wall 87a of the clutch outer cover 87. This weld is only provided at several locations. If productivity is of no concern, it is appropriate that the entire circumference of the inner periphery of the end portion of the vibration isolation ring 92 be welded to the outer periphery of the drum wall 87b on the side opposite to the bottom wall 87a of the clutch outer cover 87. It is also appropriate that the inner periphery on both ends of the vibration isolation ring 92 be welded to the outer periphery of the drum wall 87b.

While a working example of the present invention has been described above, the present invention is not limited to the working example described above, but various design alterations may be carried out without departing from the present invention as set forth in the claims.

We claim:

1. A centrifugal clutch, comprising:
an output member;
an input member that is coaxial with the output member;
a clutch outer cover formed in a substantially cylindrical bowl shape and coaxially connected to the output member, the clutch outer cover comprising a bottom wall and a cylindrical drum wall, wherein an outer periphery of the bottom wall is integrally attached to one end of the drum wall;
a clutch inner plate connected to the input member;
a plurality of centrifugal weights disposed inwardly from the drum wall, each centrifugal weight comprising a friction material capable of frictionally engaging an inner surface of the drum wall, each centrifugal weight being pivotally supported on the clutch inner plate so as to be capable of frictionally contacting the inner surface of the drum wall in response to application of a centrifugal force;
a clutch spring urging the centrifugal weight in a direction in which the friction material is spaced away from the inner surface of the drum wall; and
a vibration isolation ring fastened to the drum wall, the vibration isolation ring having a substantially cylindrical shape;
wherein the vibration isolation ring is disposed surrounding the drum wall at a position substantially corresponding to a location of a sliding contact of the friction material with the drum wall; and
wherein an end portion of the vibration isolation ring is welded to an outer periphery of the drum wall on a side of the drum wall that is spaced away from the bottom wall of the clutch outer cover.

2. The centrifugal clutch according to claim 1, wherein the vibration isolation ring is formed with a wall thickness greater than the thickness of the drum wall.

3. The centrifugal clutch according to claim 1, wherein the inner surface of the drum wall is smoothed by machining.

4. The centrifugal clutch according to claim 1, wherein a friction surface of the friction material is initially shaped to be inclined such that the spacing between the friction surface and the drum wall is least on a side of the drum wall that is farthest away from the bottom wall.

5. The centrifugal clutch according to claim 4, wherein proximal portions of the centrifugal weights are pivotally supported on the clutch inner plate via support pins, the support pins located at a plurality of positions in a circumferential direction of the clutch inner plate; and
wherein one end of the clutch spring is compressively hooked to a proximal portion of one of the plurality of centrifugal weights, and another end of the clutch spring is hooked to an intermediate portion of another of the plurality of centrifugal weights,
wherein the one of the plurality of centrifugal weights and the another of the plurality of centrifugal weights are mutually adjoining in the circumferential direction of the clutch inner plate, and wherein the clutch spring is disposed on a side of the centrifugal weights which faces the bottom wall of the clutch outer cover.

6. The centrifugal clutch according to claim 5, wherein the clutch spring is disposed in a depression formed in each of the plurality of centrifugal weights, the depression positioned on the side of each of the plurality of centrifugal weights so as to face the bottom wall of the clutch outer cover.

7. The centrifugal clutch according to claim 2, wherein the vibration isolation ring is formed with a wall thickness that is approximately twice the thickness of the drum wall.

8. The centrifugal clutch according to claim 1, wherein an end portion of the vibration isolation ring is welded to an outer periphery of the drum wall at plural discrete weld locations spaced substantially equidistantly around the drum wall in the circumferential direction.

9. The centrifugal clutch according to claim 8, wherein the number of plural discrete weld locations comprises six.

10. The centrifugal clutch according to claim 1, wherein an end portion of the vibration isolation ring is welded to an outer periphery of the drum wall at plural discrete weld locations, the plural discrete weld locations
spaced equidistantly in the circumferential direction, and
positioned so as to be out of phase with respect to the circumferential positions of the plurality of centrifugal weights.

11. A centrifugal clutch, comprising:
a clutch outer cover formed substantially into a bowl shape, the clutch outer cover comprising a bottom wall and a cylindrical drum wall, wherein an outer periphery of the bottom wall is integrally attached to one end of the drum wall;
a clutch inner plate;
a plurality of centrifugal weights disposed inwardly from the drum wall, each centrifugal weight comprising a friction material configured to allow a frictional engagement with an inner surface of the drum wall, each centrifugal weight being pivotally supported on the clutch inner plate so as to be brought into a frictional contact with the inner surface of the drum wall in accordance with application of a centrifugal force;
wherein a friction surface of the friction material is angled such that the spacing between the friction surface and the drum wall is least on a side of the drum wall that is farthest away from the bottom wall;
a clutch spring urging the centrifugal weight in a direction away from the inner surface of the drum wall; and
a vibration isolation ring fastened to the drum wall, the vibration isolation ring comprising a hollow cylindrical shape, the vibration isolation ring having a uniform diameter and a uniform wall thickness;

wherein the vibration isolation ring is disposed surrounding the drum wall at a position substantially corresponding to a location of a sliding contact of the friction material with the drum wall.

12. The centrifugal clutch according to claim 11, wherein the vibration isolation ring is formed with a wall thickness that is approximately twice the thickness of the drum wall.

13. The centrifugal clutch according to claim 11, wherein the wall thickness of the vibration isolation ring is greater than the thickness of the drum wall.

14. The centrifugal clutch according to claim 11, wherein an end portion of the vibration isolation ring is welded to an outer periphery of the drum wall on a side of the drum wall that is spaced away from the bottom wall of the clutch outer cover, the plural discrete weld locations spaced equidistantly in the circumferential direction.

15. The centrifugal clutch according to claim 11, wherein an end portion of the vibration isolation ring is welded to an outer periphery of the drum wall on a side of the drum wall that is spaced away from the bottom wall of the clutch outer cover, the plural discrete weld locations
spaced equidistantly in the circumferential direction, and positioned so as to be out of phase with respect to the circumferential positions of the plurality of centrifugal weights.

16. A centrifugal clutch, comprising:
a clutch outer cover formed substantially into a bowl shape, the clutch outer cover comprising a bottom wall and a cylindrical drum wall, wherein an outer periphery of the bottom wall is integrally attached to one end of the drum wall;
a clutch inner plate;
a plurality of centrifugal weights disposed inwardly from the drum wall, each centrifugal weight comprising a friction material configured to allow a frictional engagement with an inner surface of the drum wall, each centrifugal weight being pivotally supported on the clutch inner plate so as to be brought into a frictional contact with the inner surface of the drum wall in accordance with application of a centrifugal force;
a clutch spring urging the centrifugal weight in a direction away from the inner surface of the drum wall; and
a vibration isolation ring fastened to the drum wall, the vibration isolation ring comprising a hollow cylindrical shape, the vibration isolation ring having a uniform diameter and a uniform wall thickness;
wherein the vibration isolation ring is disposed surrounding the drum wall at a position substantially corresponding to a location of a sliding contact of the friction material with the drum wall; and
wherein an end portion of the vibration isolation ring is welded to an outer periphery of the drum wall on a side of the drum wall that is spaced away from the bottom wall of the clutch outer cover.

17. A method of assembling a vibration isolation ring to a centrifugal clutch, the centrifugal clutch comprising:
an output member;
an input member that is coaxial with the output member;
a clutch outer cover formed by pressing into substantially a bowl shape and connected coaxially to the output member, the clutch outer cover comprising a bottom wall and a cylindrical drum wall, wherein an outer periphery of the bottom wall is integrally attached to one end of the drum wall and wherein the diameter of the drum wall adjacent to the bottom wall is less than the diameter of the drum wall at a side of the drum wall opposed to the bottom wall; and
a clutch inner plate connected to the input member,
the vibration isolation ring comprising a hollow cylindrical shape, the vibration isolation ring having a uniform diameter and a uniform wall thickness,
wherein said method comprises the steps of:
a) press fitting the clutch outer cover into the hollow interior of the vibration isolation ring; and
b) welding an end portion of the vibration isolation ring to an outer periphery of the drum wall on a side of the drum wall that is spaced away from the bottom wall of the clutch outer.

18. The method of assembling a vibration isolation ring to a centrifugal clutch of claim 17, wherein the welding is accomplished so as to provide plural discrete weld locations spaced equidistantly in the circumferential direction.

19. The method of assembling a vibration isolation ring to a centrifugal clutch of claim 17, wherein the clutch further comprises a plurality of centrifugal weights disposed inwardly from the drum wall, each centrifugal weight:
comprising a friction material configured to allow a frictional engagement with an inner surface of the drum wall; and
being pivotally supported on the clutch inner plate so as to be capable of frictionally contacting the inner surface of the drum wall in response to application of a centrifugal force;
wherein a friction surface of the friction material is initially shaped to be inclined such that the spacing between the friction surface and the drum wall is least on a side of the drum wall that is farthest away from the bottom wall.

20. The method of assembling a vibration isolation ring to a centrifugal clutch of claim 17, wherein the vibration isolation ring is formed with a wall thickness that is approximately twice the thickness of the drum wall.

* * * * *